S. E. MOINE.
VIGNETTING ATTACHMENT FOR MULTIPLE EXPOSURE CAMERAS.
APPLICATION FILED NOV. 3, 1919.

1,373,626.

Patented Apr. 5, 1921.
2 SHEETS—SHEET 1.

Inventor.
S. E. Moine.

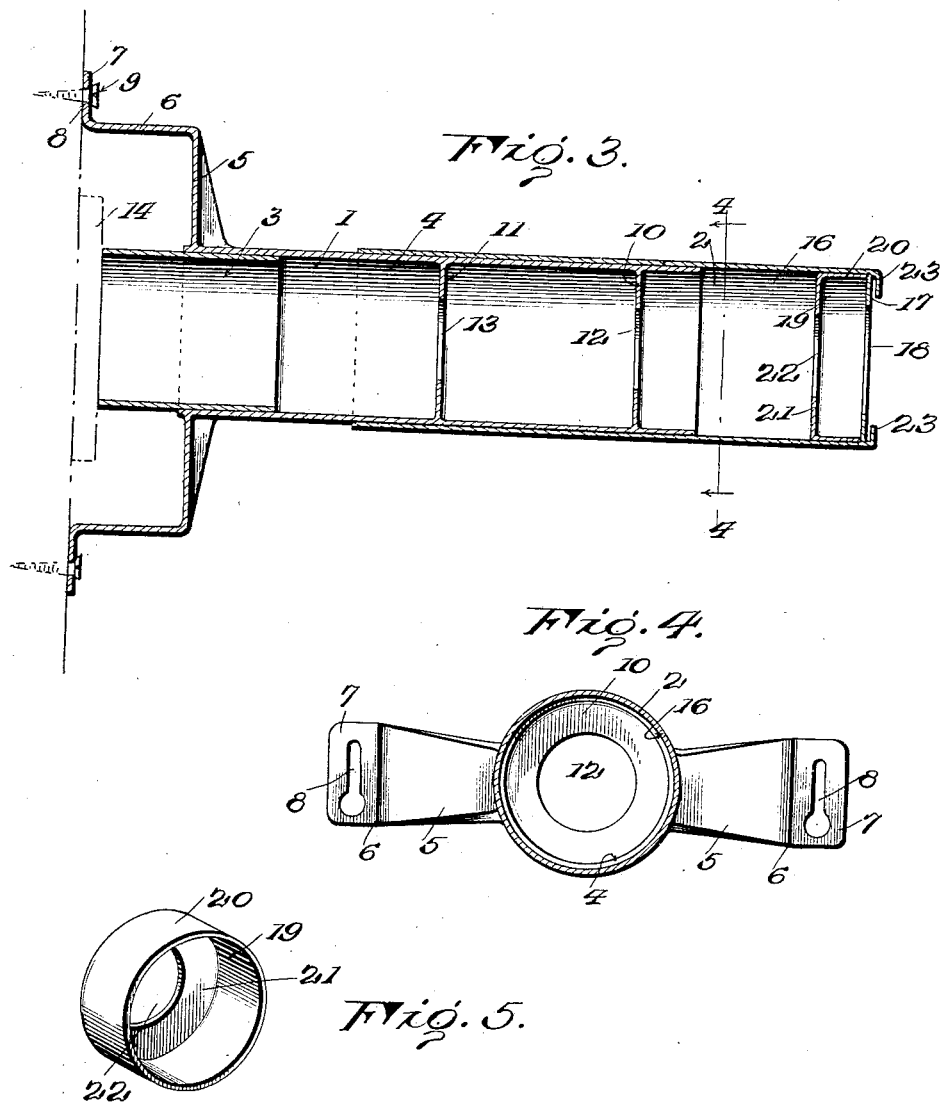

UNITED STATES PATENT OFFICE.

SELEST E. MOINE, OF LUBBOCK, TEXAS.

VIGNETTING ATTACHMENT FOR MULTIPLE-EXPOSURE CAMERAS.

1,373,626.  Specification of Letters Patent.  Patented Apr. 5, 1921.

Application filed November 3, 1919. Serial No. 335,382.

*To all whom it may concern:*

Be it known that I, SELEST E. MOINE, a citizen of the United States, residing at Lubbock, in the county of Lubbock and State of Texas, have invented certain new and useful Improvements in Vignetting Attachments for Multiple-Exposure Cameras, of which the following is a specification.

This invention relates to camera attachments and has as its primary object to provide an attachment especially designed for use in connection with portrait cameras and by the use of which a number of exposures may be made upon a single photographic plate or film and the backgrounds of the several exposures may be perfectly blended so that there will be no well defined line of demarcation between adjacent exposures. Thus by the use of the attachment practically any desired number of photographs may be made of one or more individuals, each exposure portraying a different posture, for example, and yet a print from the negative will show no harsh lines of division between the various exposures.

In the accompanying drawings:

Fig. 3 is a vertical longitudinal sectional view through the attachment;

Fig. 4 is a vertical transverse sectional view on the line 4—4 of Fig. 3;

Fig. 5 is a perspective view illustrating one element of the attachment.

Figures 1, 2:
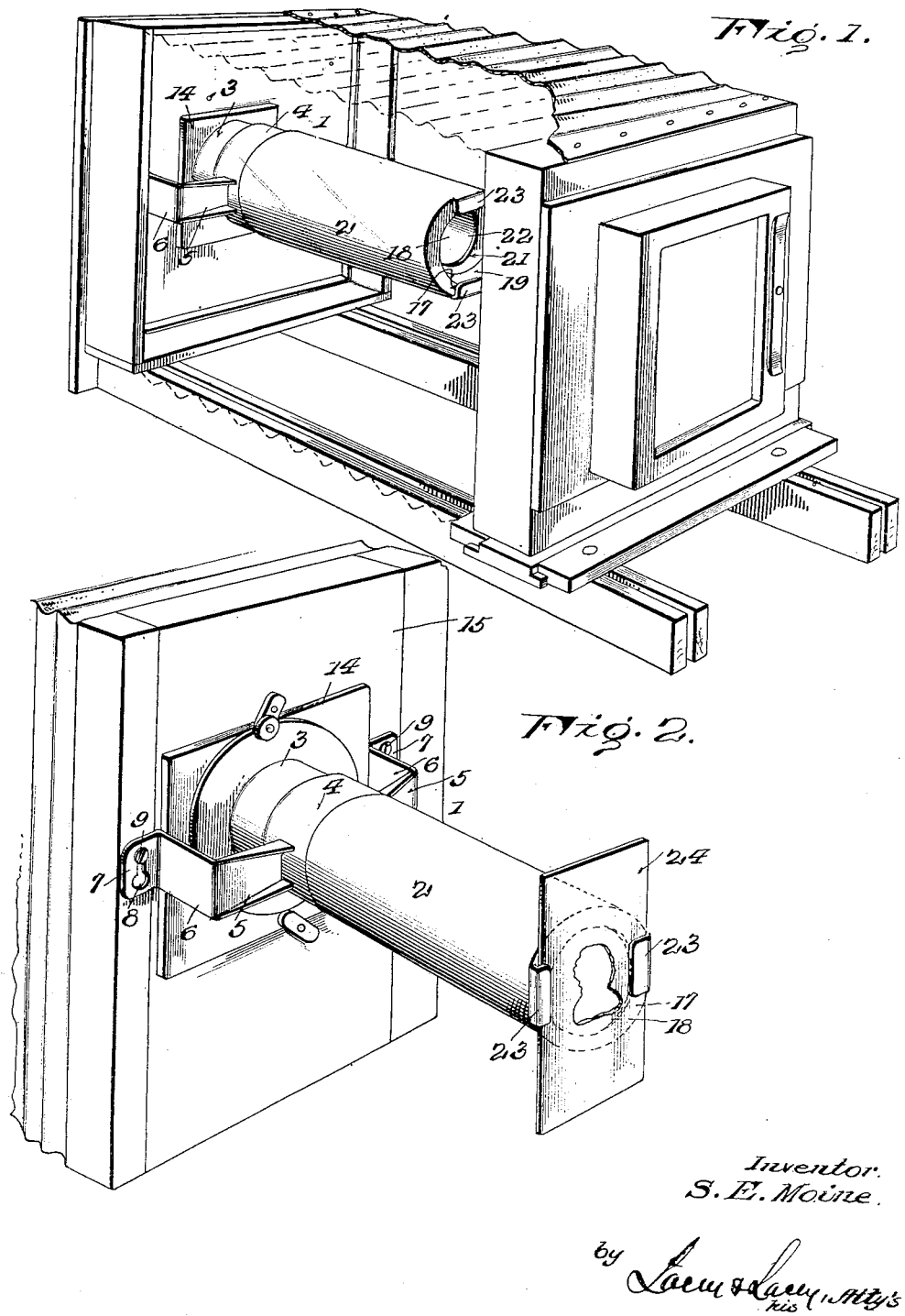
Figure 1 is a perspective view illustrating the manner of employing the attachment within a camera.
Fig. 2 is a similar view illustrating the manner in which the attachment may be employed upon the face of a camera front.

The attachment comprises several telescopically assembled members certain of which embody means for interrupting or breaking up the light rays passing from the object to the camera lens, and in the drawings one of these members is indicated in general by the numeral 1, another by the numeral 2, and a third by the numeral 3. All three of these members are of tubular form and they may be of metal or any other suitable material, and in their assembled relation, the member 2 telescopically fits onto the member 1 and the member 3 telescopically fits into the said member 1. The member 1 comprises a tube 4 provided at what may be termed its inner end with attaching arms 5 which project laterally in opposite directions from the said end of the member and are thence turned at right angles as indicated by the numeral 6 and finally again at right angles in an outward direction as indicated by the numeral 7, the portion 7 constituting the attaching portions and each being formed with a keyhole slot indicated by the numeral 8. In providing for the attachment of the arms 5 to the camera front, whether to the inner side of the front as shown in Fig. 1, in which event the attachment will be located within the bellows body of the camera, or to the forward face of the front as illustrated in Fig. 2, screws or headed stud members 8 are provided upon the camera front and over them may be engaged the slotted attaching portions 7 of the arms 5 in the manner clearly shown in Figs. 2 and 3 of the drawings. In this manner the attachment may be readily applied to the camera and it may be readily removed therefrom. The tube 4 is provided interiorly with one or more apertured diaphragms, in the present instance two, one indicated by the numeral 10 and the other by the numeral 11, the diaphragm 10 being located near the outer end of the tube 4 and the diaphragm 11 being located approximately intermediate of the said tube. The openings in these diaphragms are indicated respectively by the numerals 12 and 13 and permit the passage of light rays through the tube from the object to the lens of the camera. However, these diaphragms serve to interrupt or break up the light rays and cut off reflected light as will be readily apparent.

When the member 1 is applied to the camera front in the manner above described the inner end of the tube 4 will, of course, be spaced a greater or less distance from the lens mount which is indicated by the numeral 14, and in order to exclude light from the space between the lens mount and the said inner end of the tube 4, the section 3 is provided and is telescopically fitted within the inner end of the said tube 4 and may be slidably adjusted so as to extend between the inner end of the said tube and the lens mount, contacting at its inner end the said lens mount and surrounding the aperture thereof for the purpose stated. Of course, this member 3 permits of the application of the attachment to various types of cameras in which the lens mount will project a greater or less distance in front of the plane of the camera front, which latter in the drawings is indicated by the numeral 15.

As before stated, the member 2 is slidably telescopically fitted onto the tube 4 and this member 2 comprises a tube 16 which is provided at its extreme forward end with a diaphragm 17 corresponding to the diaphragms 10 and 11 and formed with an opening 18 preferably of slightly greater diameter than the openings 12 and 13. A diaphragm member such as shown in Fig. 5 of the drawings and indicated in general by the numeral 19, is removably fitted into the tube 16 and this member comprises an annular body 20 provided at one end with a diaphragm 21 having an aperture 22 of approximately the same diameter as the apertures 12 and 13. The annular body 20 is of a diameter to snugly and yet slidably fit within the tube 16 and the member 19 is preferably disposed within the forward end of the said tube in the manner clearly shown in Fig. 3 of the drawings, the diaphragm 21 of the said member being spaced from the diaphragm 17 through the interposition of the annular body 20. It will be observed by reference to Figs. 1, 2 and 3 of the drawings that the tube 16 is provided at its outer end with fingers 23 which project inwardly toward each other and are located at opposite sides of the said end of the tube, these fingers being spaced slightly from the plane of the forward face of the diaphragm 17 and providing means for holding a vignetting card 24 which may be improvised by tearing out from a piece of cardboard or paper a portion to form an opening of approximately the contour of the head and shoulders of the individual to be photographed.

From the foregoing description of the invention it will be evident that with the vignetting card in place, the member 2 may be slidably adjusted upon the member 1 and the camera may be focused until the photographer obtains an image of the desired size and suitably located upon the ground glass of the camera back whereupon the exposure may be made, the plate holder temporarily removed, another image focused upon the ground glass, another exposure made, and so on until the desired number of exposures have been made upon the plate. Of course, the subject may be posed for each exposure, and using the arrangement of diaphragms, the light rays passing from the subject to the camera lens will be interrupted or broken and reflected light cut off in such a manner that the backgrounds of the various exposures will perfectly blend. Of course, by slidably adjusting the member 2, in which adjustment the diaphragm 21 is adjusted with relation to the diaphragms 10 and 11, the shading, so to speak, of the background may be effectually controlled.

Having thus described the invention, what is claimed as new is:

1. In an attachment of the class described, telescopic tubular members, means for attaching one of said members to a camera front, and a plurality of spaced light ray interrupting means within one of said members.

2. In an attachment of the class described, telescopic tubular members, means for attaching one of said members to a camera front, and a plurality of apertured light ray interrupting diaphragms within one of said members.

3. In an attachment of the class described, telescopic tubular members, means for attaching one of said members to a camera front, and an apertured light ray interrupting diaphragm within each of said members.

4. In an attachment of the class described, telescopic tubular members, an attaching means carried by one of said members whereby it may be applied to a camera front, a light ray interrupting means within one of said members, and means upon the outer end of the slidable member for supporting a vignetting element.

5. In an attachment of the class described, telescopic tubular members, means for attaching one of said members to a camera front, a plurality of apertured light ray interrupting diaphragms within said member arranged in spaced relation, and a light ray interrupting diaphragm in another one of said members.

6. In an attachment of the class described, telescopic tubular members, means for attaching one of said members to a camera front, a light ray interrupting means within one of said members, and a tubular member telescopically fitting the attachable member and adjustable to extend between the inner end thereof and the lens mount of the camera front.

In testimony whereof I affix my signature.

SELEST E. MOINE. [L. S.]